(12) United States Patent  
De Donato

(10) Patent No.: US 6,351,865 B1
(45) Date of Patent: Mar. 5, 2002

(54) COMBINATION WIRE CUTTER, WIRE STRIPPER, AND PUNCH-DOWN TOOL

(76) Inventor: Jack De Donato, 55-06 68th St., New York, NY (US) 11378

( * ) Notice: Subject to any disclaimer, the term of this patent is extended or adjusted under 35 U.S.C. 154(b) by 0 days.

(21) Appl. No.: 09/511,384

(22) Filed: Feb. 23, 2000

(51) Int. Cl.$^7$ .................................................. B26B 11/00
(52) U.S. Cl. ................................. 7/107; 7/158; 81/9.44
(58) Field of Search ............................. 81/9.44; 7/107, 7/158

(56) References Cited

U.S. PATENT DOCUMENTS

| | | | |
|---|---|---|---|
| 3,716,914 A | 2/1973 | Freije | 30/90.1 |
| 3,916,733 A | 11/1975 | Meadows | 81/9.51 |
| 3,987,527 A | 10/1976 | Meadows | 269/236 |
| 4,161,061 A | 7/1979 | Mason et al. | 29/566.4 |
| 4,241,496 A | 12/1980 | Gregson | 29/751 |
| 4,441,386 A | 4/1984 | Hara | 81/9.51 |
| 4,451,947 A * | 6/1984 | Frieber | 7/107 |
| 4,569,128 A * | 2/1986 | Thomas | 29/751 |
| 5,829,322 A * | 11/1998 | Chen | 81/9.44 |
| 5,893,185 A * | 4/1999 | Okrepkie et al. | 7/107 |
| 6,089,125 A * | 7/2000 | Cheng | 81/9.44 |

* cited by examiner

Primary Examiner—Joseph J. Hail, III
Assistant Examiner—David B. Thomas
(74) Attorney, Agent, or Firm—Michael L. Greenberg, Esq.; Greenberg & Lieberman Law Offices

(57) ABSTRACT

The present invention is a hand tool incorporating a wire stripper, a wire cutter, and a punch-down tool all in a single unit. The punch-down tool is retractable and is located at one extremity of the body of the tool. The wire cutting apparatus, using a basic scissoring motion to cut wires, is mounted along either side of the tool body, or within the tool body, depending upon the particular embodiment of the invention in question. The wire stripping apparatus utilizes the pressure of the user's fingers to press a wire or set of wires against a razor blade.

18 Claims, 4 Drawing Sheets

COMBINATION WIRE CUTTER, WIRE STRIPPER, AND PUNCH-DOWN TOOL

FIELD OF THE INVENTION

The present invention relates generally to mechanically-powered hand tools. More particularly, the present invention is a hand tool combining the functions of a wire cutter, a wire stripper and a punch-town tool in a single unit.

BACKGROUND OF THE INVENTION

Wire stripping, wire cutting, and punching-down are three tasks often important in the construction, repair and maintenance of electrically-powered machines and the attachment of telephone and/or computer cables. Wire stripping consists of the removal of insulation from lengths of wire or cable, thereby making it possible for a user to gain access to an inner conductor to make electrical contact. Wire cutting is the process of cutting long wires into definite lengths. Punching down is the process whereby a wire or set of wires is securely attached to an electrical connection.

Normally, the process of attaching wires to electrical connections requires all three actions; the wires must be stripped, cut to an appropriate length, and then punched down so as to firmly attach the wires to the connection. This means, assuming that the process is not automated, that either one person must perform all three tasks, or that the tasks will be divided up amongst a number of people. Either way, this results in a highly inefficient process.

If the tasks are performed by separate persons, it becomes unwieldy due to the inherent difficulties involved in any team project. If the tasks are performed by one and the same person, the process is still inefficient. Normally, the various tasks involved, wire stripping, wire cutting, and punching down, are performed using separate tools. This means that the person must suffer the inconvenience of changing tools periodically. This obviously entails a great loss of efficiency as well as being a source of irritation to the user.

Although tools exist that combine a plurality of these functions, such tools are by and large stationary installations meant for doing bulk work with large amounts of wire. While this certainly increases efficiency and ease when such work must be done, it obviously is of no use for doing small-scale or detailed work. Nor is it useful for a person who desires to work with an easily transported hand tool.

Previous patents exist showing combination tools incorporating what are normally discrete tools into a single unit. For instance, previous patents exist disclosing tools designed to cut and strip wires in a single operation. Examples of this are U.S. Pat. No. 3,716,914, issued to Freije on Feb. 20, 1973, U.S. Pat. No. 3,916,733, issued to Meadows on Nov. 4, 1975, U.S. Pat. No. 3,987,527, issued to Meadows on Oct. 26, 1976, and U.S. Pat. No. 4,441,386, issued to Hara on Apr. 10, 1984. However, none of these patents show hand tools; all are stationary units that are lever- or crank-operated. Moreover, none of the inventions shown in these patents incorporates a punch-down element with a stripper. Accordingly, they are not exceptionally relevant to the present invention.

Patents are also extant showing hand tools combining wire cutting and other elements in a single apparatus. Examples of this include U.S. Pat. No. 4,161,061, issued to Mason et al. on Jul. 17, 1979, and U.S. Pat. No. 4,241,496, issued to Gregson on Dec. 30, 1980. Although these patents do show wire cutting implements combined with other tools into a single unit, none of these devices embody all of the functions of a wire cutter, a wire stripper, and a punch-down tool in a single apparatus.

Therefore a need has been established for a hand tool combining the functions of a wire cutter, wire stripper, and punch-down tool in a single unit.

SUMMARY OF THE INVENTION

The present invention aims to correct previous problem by means of providing a small, easily used hand tool incorporating all three functions, that of a wire stripper, wire cutter, and punch-down tool, in a single unit. The tool permits a user to easily switch between functions, thereby greatly increasing working efficiency and decreasing inconvenience.

The present invention is a hand tool combining the functions of a wire stripper, wire cutter, and punch-down tool. All the features necessary to accomplish these tasks are mounted upon a single, easily carried and handled unit. Punching-down is accomplished using a blade insert located at one extremity of the tool body. Wire cutting is performed by means of a scissoring apparatus mounted on one side of the tool body. Wire splitting is done using a mechanism to press lengths of wire against a sharp blade surface along which they can be drawn lengthwise, thereby shearing insulation off the length of the wire.

It is an object of the present invention to provide a tool combining the functions of a wire cutter, wire stripper, and punch-down tool.

It is another object of the present invention to provide a tool, combining all the functions of a wire cutter, wire-stripper, and punch-down tool, that can be held in one hand.

It is a further object of the present invention to provide a combination wire cutter, wire stripper, and punch-down tool the various functions of which can be easily accessed through the simple means of changing the position of the tool relative to the user's hand.

It is yet another object of the present invention to provide a hand tool incorporating a wire cutter, wire stripper, and punch-down tool, the first of these three mounted along the length of the tool body and the second two fixed to opposite extremities of the tool body.

It is another object of the present invention to provide a hand-held, easily usable tool, incorporating a wire cutter, wire stripper, and punch-down tool, that is fully functional in accomplishing its goals.

DETAILED DESCRIPTION OF THE PREFERRED EMBODIMENTS

Figure 1:
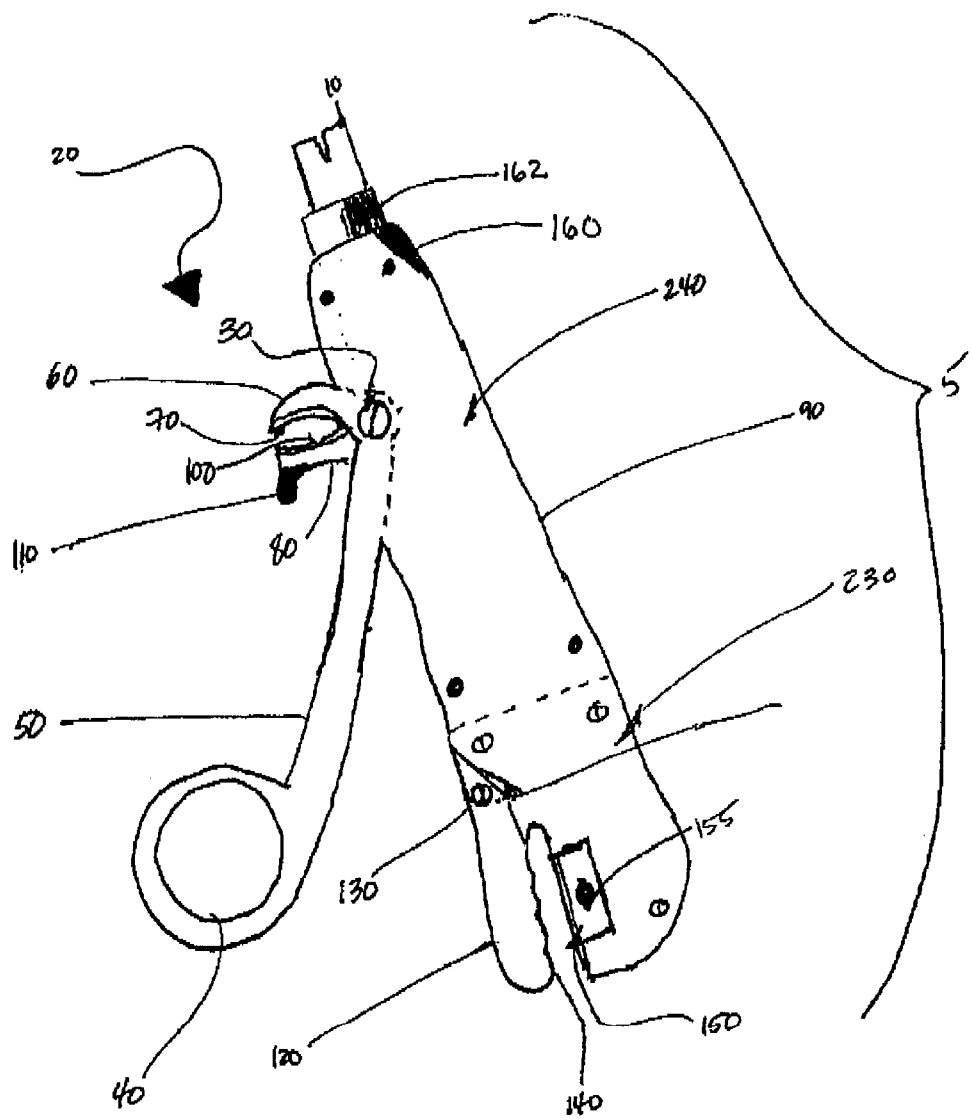
FIG. 1 is a side view of the present invention in one preferred embodiment.

Turning to FIG. 1, we see a side view of the tool (5) of the present invention in one of its preferred embodiments. At one extremity of main body (90) of tool (5) is mounted a blade insert (10) for use in punching down wires. The blade insert (10) can be easily released and retracted by means of a conventional thumb switch (160) which communicates with blade insert (10) via conventional means (not shown) disposed within collar (162).

On one side of the tool (5) is a wire cutter apparatus (20) which is attached to the body (90) of the tool (5) by means of an upper rotating screw (30). In the embodiment shown in FIG. 1, the wire cutter apparatus (20) is opened and shut by means of a gripping ring (40) which is attached to a long handle (50). Attached to the other extremity of the long handle (50), and mounted perpendicularly to it, is an upper cutting jaw (60) with a first blade (70) mounted along its lower side.

It is contemplated that the wire cutter apparatus (20) is partially disposed within the body (90) of the tool (5), such that wire cutter apparatus (20) can engage upper rotating screw (30). In such a configuration, body (90) would have a cavity (not shown) for receiving part of wire cutter apparatus (20). Alternatively, the wire cutter apparatus (20) is disposed outside of body (90) of the tool (5), such that wire cutter apparatus (20) can engage upper rotating screw (30). The body (90) of the tool (5) can optionally be two mirror-image pieces (not shown) which are held together by upper rotating screw (30) on the wire cutting apparatus (20).

When the long handle (50) of the wire cutting apparatus (20) is moved from an open to a closed position (that is, moved toward the body (90)), the upper cutting jaw (60) is brought into contact with a lower cutting jaw (80). Lower cutting jaw (80), which attaches to the body (90) at a ninety-degree angle, features a second blade (100) which is mounted along its upper side. This permits wires to be easily cut. Jutting off in a downward direction from the lower cutting jaw (80) is a finger guard (110).

The body (90) of the tool (5) tapers from its back end (230) to its front end (240). Located at the other extremity from the blade insert (10) is a first wire pressing section (120) pivotally attached to the body (90) of the tool (5) by means of a lower rotating screw (130). The inner surface of the first wire pressing section (120) is lined with a series of press teeth (140). When the first wire pressing section (120) is pushed inward, the first press teeth (140) make contact with a first razor surface (150). The first razor surface (150) is attached to the body (90) of the tool (5) by a screw (155). This feature of the tool (5) allows wires held therein to be easily stripped. The body (90) of the tool (5) is contoured for ease of handling.

Figure 2:
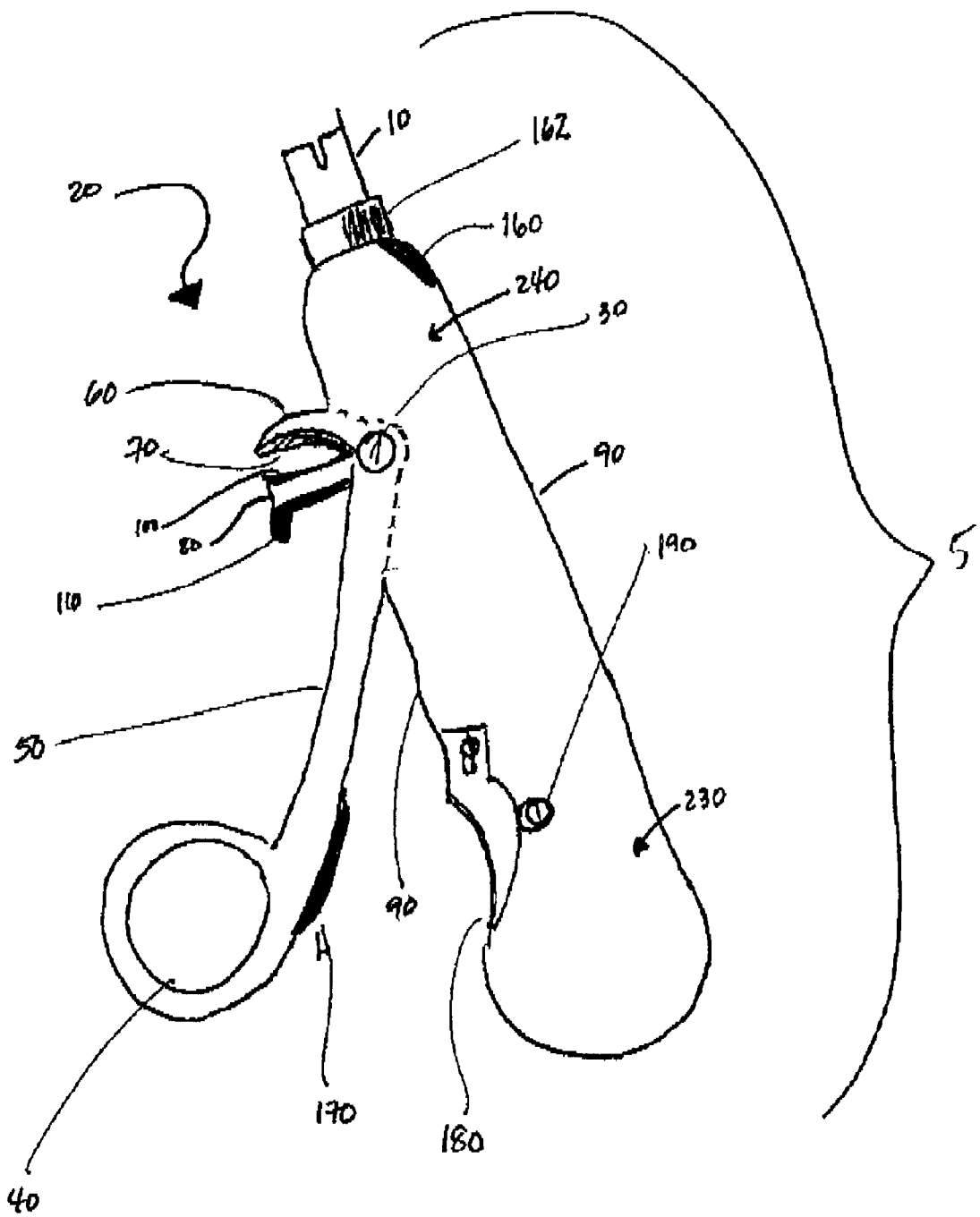
FIG. 2 is a side view of the present invention in a second preferred embodiment.

FIG. 2 shows a side view of the present invention (5) in a second preferred embodiment. It is largely similar to the tool (5) as described in the first preferred embodiment, with the following exceptions. On the inner side of the long handle (50), near the gripping ring (40), is mounted a second wire pressing section (170). Second wire pressing section (170) is merely a nub of material. When the long handle (50) is brought into proximity to the body (90) of the tool (5), the wire pressing section (170) is brought into contact with a curved razor edge (180). This action allows easy stripping of wires. The curved razor edge (180) can be adjusted by means of an attached cam screw (190). Thus, the first wire pressing section (120) of the embodiment shown in FIG. 1 is replaced by the second wire pressing section (170) as in the embodiment shown in FIG. 2.

Figure 3:
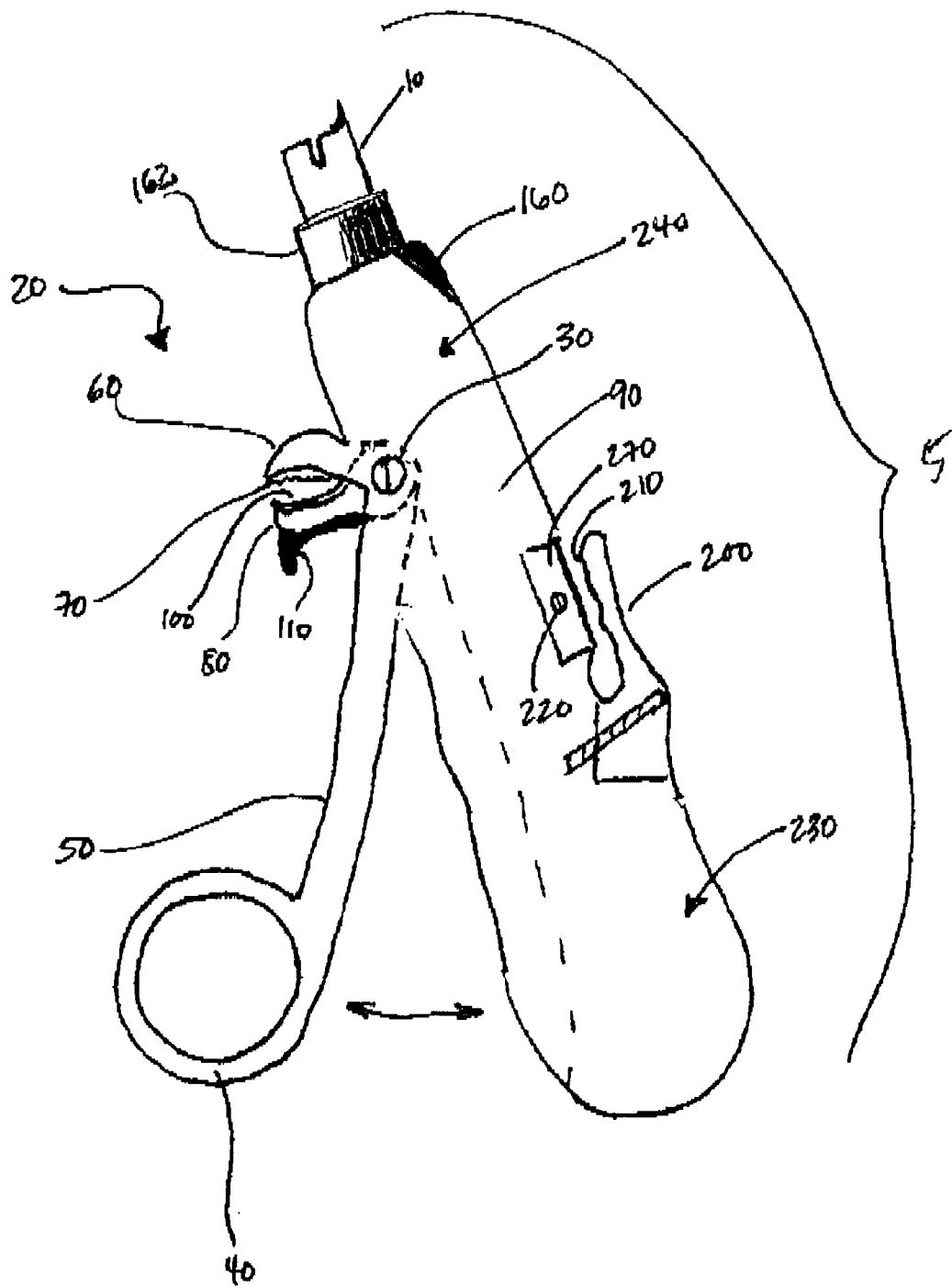
FIG. 3 is a side view of the present invention in a third preferred embodiment.

FIG. 3 shows a side view of the tool (5) in a third preferred embodiment. It is largely similar to the first embodiment as shown in FIG. 1, with the following exceptions. A third wire pressing section (200) is attached to the second side of the body (90), such that third wire pressing section (200) can be easily pressed inward by the user's thumb. Along the inner surface of the wire pressing section (200) is mounted a series of second press teeth (210). When the wire pressing section (200) is pushed inward, it makes contact with a second razor surface (270) which is attached to the body (90) of the tool (5) by a screw (220). Third wire pressing section (200) allows for easy stripping of wires.

Figure 4:
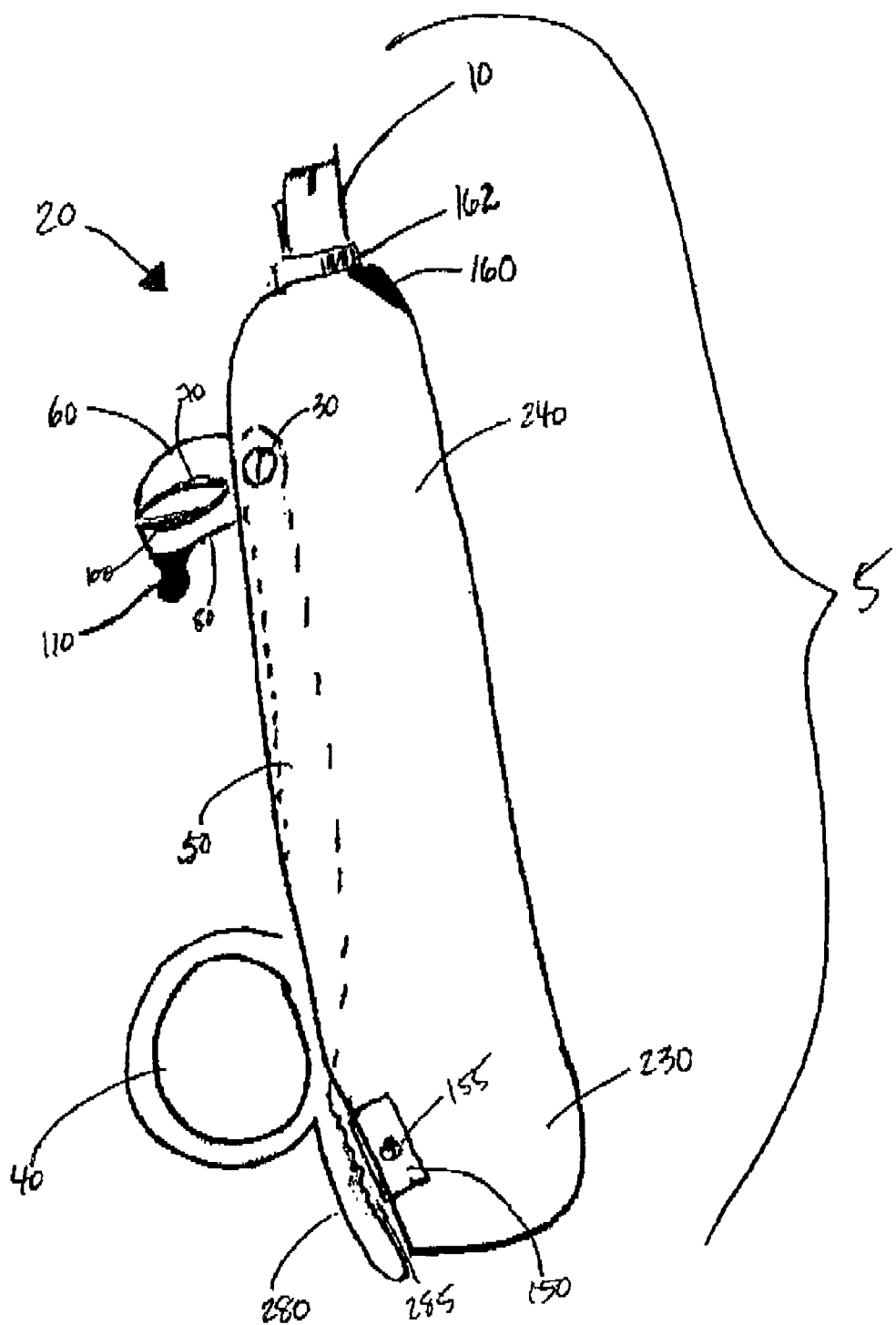
FIG. 4 is a side view of the present invention in a fourth preferred embodiment.

FIG. 4 shows a side view of the tool (5) in a fourth preferred embodiment. It is largely similar to the tool (5) as described in its first preferred embodiment, with the following exceptions. In FIG. 1, the first wire pressing section (120) is attached to the body (90) of the tool (5). In FIG. 4, the fourth wire pressing section (280) is attached to the gripping ring (40). On the inner side of the fourth pressing section (280) are third press teeth (285) that make contact with a first razor surface (150) which is held in place by a screw (155). Fourth pressing section (280) easily strips wires that are placed between third press teeth (285) and first razor surface (150).

I claim:

1. A tool, comprising:
   a main body, having two ends and two sides;
   a blade insert, disposed at one end of said main body;
   a wire cutter apparatus, disposed at one side of said main body,
   a cavity for receiving said wire cutter apparatus,
   an upper rotating means for disposing said wire cutter apparatus; and
   a wire pressing section, disposed at a second end of said main body.

2. The tool as in claim 1, wherein said main body is two mirror-image pieces.

3. The tool as in claim 2, wherein an upper rotating means for disposing said wire cutter apparatus holds said two mirror image pieces together.

4. The tool as in claim 1, wherein said main body tapers.

5. The tool as in claim 1, further comprising a conventional thumb switch on said main body, said conventional thumb switch communicating with said blade insert.

6. The tool as in claim 1, further comprising a handle adjacent to said wire cutter apparatus.

7. The tool as in claim 6, further comprising a ring adjacent to said handle.

8. The tool as in claim 6, further comprising an upper cutting jaw adjacent to said handle.

9. The tool as in claim 8, further comprising a first blade mounted along said upper cutting jaw.

10. The tool as in claim 6, further comprising a lower cutting jaw adjacent to said handle.

11. The tool as in claim 10, further comprising a second blade mounted along said lower cutting jaw.

12. The tool as in claim 10, further comprising a finger guard adjacent to said lower cutting jaw.

13. The tool as in claim 1, wherein said wire pressing section has an inner surface line with a series of press teeth.

14. The tool as in claim 1, further comprising a first razor surface disposed on said main body near said first wire pressing section.

15. The tool as in claim 14, wherein said wire pressing section is aligned with said first razor surface so that when said first wire pressing section is pushed inward toward said main body, said first wire pressing section contacts said first razor surface.

16. A tool, comprising:
   a main body, having two ends and two sides;
   a blade insert, disposed at one end of said main body;
   a wire cutter apparatus, disposed at one side of said main body;

a handle, disposed at one side of said main body adjacent to said wire cutter apparatus; and a wire pressing section, disposed along said handle.

17. A tool, comprising:

a main body, having two ends and two sides;

a blade insert, disposed at one end of said main body;

a wire cutter apparatus, disposed at one side of said main body; and a wire pressing section, disposed at a second side of said main body.

18. A tool, comprising:

a main body, having two ends and two sides;

a blade insert, disposed at one end of said main body;

a wire cutter apparatus, disposed at one side of said main body;

a handle, disposed at one side of said main body adjacent to said wire cutter apparatus;

a ring, adjacent to said handle; and a wire pressing section, disposed on said ring.

\* \* \* \* \*